United States Patent
Castillo et al.

(10) Patent No.: US 8,780,359 B2
(45) Date of Patent: Jul. 15, 2014

(54) OPTICAL BASE PLATE ALIGNMENT

(71) Applicants: Alfredo Castillo, San Jose, CA (US); Umakaran Nemallan, Cupertino, CA (US)

(72) Inventors: Alfredo Castillo, San Jose, CA (US); Umakaran Nemallan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/629,535

(22) Filed: Sep. 27, 2012

(65) Prior Publication Data

US 2013/0286408 A1 Oct. 31, 2013

Related U.S. Application Data

(60) Provisional application No. 61/640,584, filed on Apr. 30, 2012.

(51) Int. Cl.
*G01B 11/24* (2006.01)

(52) U.S. Cl.
USPC .......................... 356/610; 356/603

(58) Field of Classification Search
USPC .......................... 356/601, 610, 603
See application file for complete search history.

(56) References Cited

U.S. PATENT DOCUMENTS

| | | | | |
|---|---|---|---|---|
| 3,604,121 A | * | 9/1971 | Hull | 33/657 |
| 4,232,969 A | * | 11/1980 | Wilczynski | 356/401 |
| 4,724,480 A | * | 2/1988 | Hecker et al. | 348/95 |
| 6,040,903 A | * | 3/2000 | Lysen et al. | 356/153 |
| 6,983,549 B2 | * | 1/2006 | Loen | 33/657 |
| 7,312,871 B2 | * | 12/2007 | Henry | 356/400 |
| 7,440,590 B1 | | 10/2008 | Hassebrook et al. | |
| 8,208,719 B2 | | 6/2012 | Gordon et al. | |
| 8,533,965 B2 | * | 9/2013 | Stromberg | 33/412 |
| 2008/0069435 A1 | | 3/2008 | Boca et al. | |
| 2011/0200248 A1 | | 8/2011 | Gerones et al. | |

* cited by examiner

*Primary Examiner* — Roy M Punnoose
(74) *Attorney, Agent, or Firm* — Womble Carlyle Sandridge & Rice LLP (57) ABSTRACT

Alignment of two surfaces of two objects in a manufacturing process is achieved by determining a best fit orientation of the two objects with respect to each other using captured images reflected from the two surfaces. An image pattern is projected on a surface of each object, and a reflected image pattern is captured from the surface of each object. A reconstructed surface is determined from the captured reflected image patterns, and the two reconstructed surfaces are superimposed to determine a best fit orientation of the two objects with respect to each other. One or more movable portions of a base are actuated to align the two surfaces to each other to achieve the determined best fit orientation.

20 Claims, 6 Drawing Sheets

Figure 6 ical Field

The present invention relates generally to the alignment of two objects in a manufacturing process. More particularly, methods, software, hardware, and systems are described for determining the orientation of two surfaces of two objects using patterns projected onto and reflecting from the two surfaces and aligning the two objects to be co-planar.

2. Related Art

Accurately positioning two objects during a manufactured process, such as two different parts of a device to be connected to each other, can be accomplished through meticulous alignment by visual or mechanical measurement and manual adjustment of the two objects with respect to each other. Such manual alignment of the two objects can require significant time and can be prone to measurement error. Precise alignment can be preferred to minimize transitions at boundaries of joined objects or at seams produced by molding processes. Rapid and accurate alignment can increase both productivity and quality in a product manufacturing process.

Thus, there exists a need for a low cost and rapid measurement method and system to determine the three-dimensional orientation of two objects with respect to each other in a manufacturing process.

SUMMARY

A method to align two surfaces of two objects in a manufacturing process is described. The method can be carried out by at least the following steps. An image pattern is projected on a first surface of a first object and on a second surface of a second object. A first reflected image pattern reflected from the first surface of the first object and a second reflected image pattern reflected from the second surface of the second object are captured by an image capture device. A first reconstructed surface is created from the first reflected image pattern, and a second reconstructed surface is created from the second reflected image pattern. The first and second reconstructed surfaces are superimposed to determine a best fit orientation of the first object to the second object. One or more movable portions of a base on which the first object rests are actuated to align the first and second surfaces to achieve the determined best fit orientation.

In another embodiment, an apparatus is described. The apparatus includes at least the following: a processing unit, an image pattern generating device, a fixture having movable portions arranged to orient a first object in three-dimensional space, and an image capture device coupled with the processing unit, wherein the image pattern generating device projects an image pattern on a first surface of the first object and on a second surface of a second object. The projected image pattern is reflected from the first and second surfaces. Two reflected image patterns are captured by the image capture device, one reflected image pattern from each of the two surfaces. The processing unit processes the reflected image patterns to create a first reconstructed surface from the first reflected image pattern and a second reconstructed surface from the second reflected image pattern, and the processing unit is configured to superimpose the reconstructed surfaces to determine a best fit orientation of the first object to the second object. Movable portions of the fixture are actuated to align the first surface of the first object relative to the second surface of the second object to achieve the determined best fit orientation.

In a further embodiment, a non-transitory computer readable medium for aligning two surfaces in a manufacturing process is disclosed. The non-transitory computer readable medium includes at least the following: computer code for projecting a first grid pattern on a first surface of a first object and a second grid pattern on a second surface of a second object; computer code for capturing a first reflected grid pattern reflected from the first surface and a second reflected grid pattern from the second surface by an image capture unit; computer code for creating a first reconstructed surface from the first reflected grid pattern and a second reconstructed surface from the second reflected grid pattern; computer code for determining a best fit orientation of the first object to the second object based on a number of points associated with the first and second reconstructed surfaces; and computer code for maneuvering the first surface of the first object relative to the second surface of the second object to achieve the determined best fit orientation.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

The present invention relates generally to the alignment of two objects in a manufacturing process. More particularly, methods, software, hardware, and systems are described for determining the orientation of two surfaces of two objects using patterns projected onto and reflecting from the two surfaces and aligning the two objects to be co-planar.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

Manufacturing processes can require alignment of two different objects with respect to each other. For example, the two different objects can be two manufactured parts to be assembled together, two different sections of a mold used to fabricate a manufactured part, or a form (first object) to shape a manufactured part (second object). Precise alignment during manufacturing can minimize disparities at boundaries joining the two objects or formed at seams for a molded object, thereby providing higher quality manufactured parts and greater efficiency within a manufacturing process. To achieve precise alignment of objects to each other, manual methods based on visual inspection or on a variety of mechanical measurements can require laborious and time consuming effort and can only provide limited accuracy. For example, representative manual alignment processes can require between one and ten hours to achieve a desired accurate alignment of objects in a manufacturing process. An automated system and method to align two surfaces of two different objects with respect to each other can improve multiple manufacturing processes.

The three dimensional surface shape of a reflective object can be estimated by analyzing an image of a pattern reflected from the surface of the reflective object. Flat reflective surfaces, e.g. a perfect mirror, provide an undistorted reflected image, while curved reflective surfaces produce a distorted image altered by the three-dimensional surface shape of the non-flat surface. By processing a captured image of the distorted reflection, one can estimate the three-dimensional shape of the surface that caused the distortion. A captured distorted image can be compared to a reference undistorted image for which one knows a set of geometric properties. For example, one can project a pre-determined image pattern onto a reflective object and compare the pre-determined image pattern to a distorted version of the image pattern reflected from the reflective object. A system to capture and process such reflected, distorted image patterns can be assembled from a number of components including a processing unit to process the images, an image pattern projection device to project the image pattern onto the reflective object, and an image capture device to capture the reflected image pattern. Two different surfaces on two different reflective objects can be captured sequentially or simultaneously and can be compared to each other. Captured reflected images from the two surfaces can be processed to generate a three-dimensional reconstruction of the surface of each of the two surfaces. The processing unit can determine an alignment in three dimensions of one surface of a first object with respect to another surface of a second object using the three-dimensional surface reconstructions. The alignment can be chosen to minimize a metric that determines a "best fit" orientation of the two surfaces of the two objects relative to each other. The processing unit can cause the two surfaces to align to each other by moving one surface with respect to the other surface. Movement of one of the objects can occur in both an x-y plane (translation) and about a pivot point (angular rotation). The aligned objects can be used as required in a manufacturing process and can have greater accuracy of alignment than can be achieved through a manual adjustment.

Figure 1:
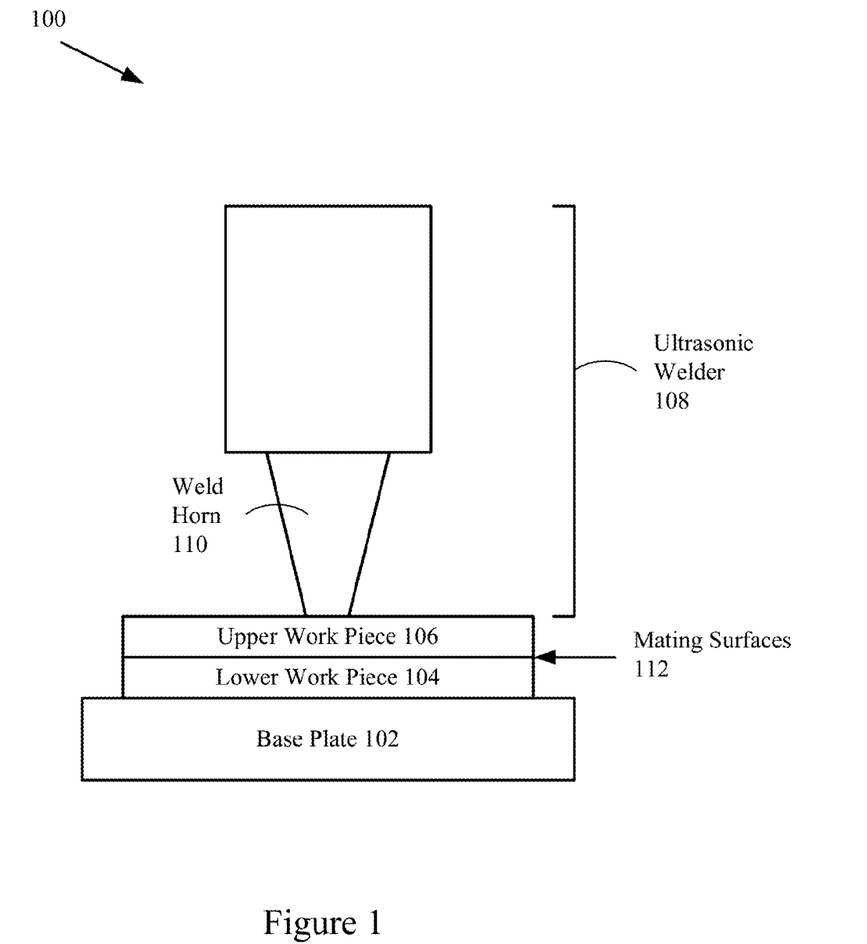
FIG. 1 illustrates an ultrasonic welding application.

FIG. 1 illustrates a representative manufacturing assembly 100 in which two work pieces 104/106 can be joined together using an ultrasonic welder 108. An upper work piece 106 can be aligned to a lower work piece 104 to ensure that mating surfaces 112 on each of the two work pieces 104/106 join together as required for the ultrasonic welding operation. The alignment of the upper work piece 106 to the lower work piece 104 can be accomplished manually and/or by having the work pieces include self alignment markings and/or mechanical joints (e.g. tongue and groove). Mechanical alignment, however, can be less accurate than desired for a manufacturing process in which the joints of the two mating surfaces can be intended to be "invisible" in the finished manufactured part. A weld horn 110 on the ultrasonic welder 108 can contact one of the work pieces, e.g. the upper work piece 106, and vibrate the work pieces 104/106 causing the mating surfaces 112 to join together. The lower work piece 104 can rest on a base plate 102 as indicated in FIG. 1. The base plate 102 can include manual adjustment mechanisms (not shown) so that the lower work piece 104 can be oriented with respect to the upper work piece 106 during the manufacturing process. Instead of a manual alignment process, an automated alignment process based on image pattern projection, capture and processing can increase the accuracy of the alignment of two objects with respect to each other as discussed further herein. The automated alignment process can orient the two objects without requiring physical contact between them. No modification to surfaces to be aligned on the two objects is required, and alignment can be specified within a particular degree of accuracy.

Figure 2:
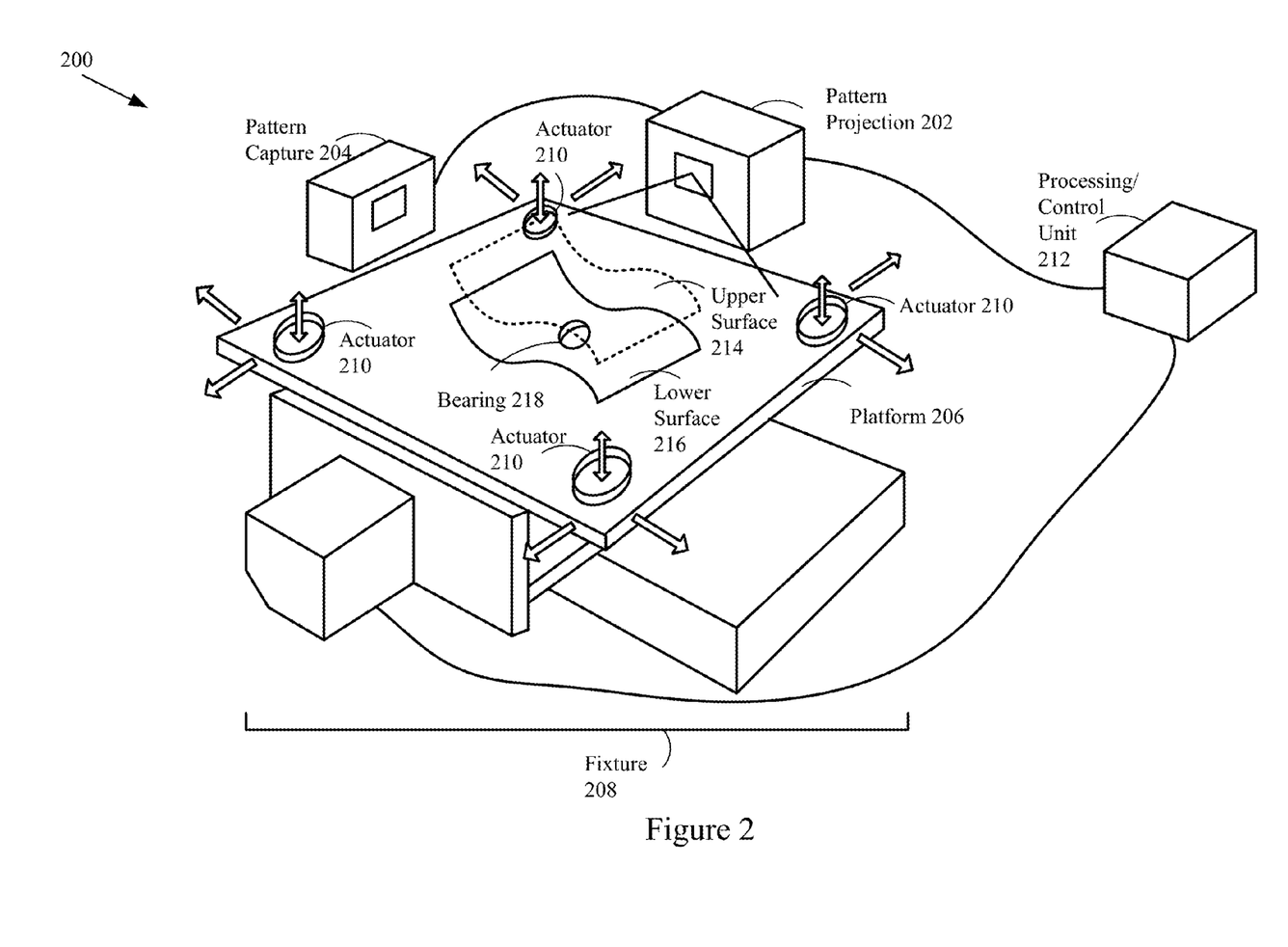
FIG. 2 illustrates a representative apparatus to align surfaces of objects in a manufacturing process.

FIG. 2 illustrates an alignment system 200 that can adjust two surfaces 214/216 of two objects with respect to each other based on image pattern projection, capture and processing. (The two objects are not shown explicitly, but rather are implicitly indicated by the two surfaces 214/216.) The lower surface 216 can represent one surface of a first object in a manufacturing process that can rest on a fixture 208. The upper surface 214 can represent one surface of a second object in a manufacturing process that can be positioned in proximity to the lower surface 216 of the first object. The first object can be manipulated in three dimensions by adjusting the position of a platform 206 of the fixture 208 and also by adjusting the height of one or more actuators 210 that can tilt (angularly rotate) the first object about a pivot point on a bearing 218 included in the platform 206. The platform 206 can be moved in an x-y plane in response to commands from a processing/control unit 212 that can activate a motor in the fixture 208. The actuators 210 can also be activated individually by the processing/control unit 212 to tilt the lower surface 216 of the first object with respect to the upper surface 214 of the second object. The processing/control unit 212 can determine in which direction to translate and/or tilt the lower surface 216 with respect to the upper surface 214 based on one or more image patterns projected onto the lower surface 216 of the first object and onto the upper surface 214 of the second object. In a representative embodiment, the lower surface 216 and the upper surface 214 can be initially placed opposite each other in a nominally co-planar position, and the automated system can realize accurate co-planarity of the lower surface 216 and the upper surface 214.

A pattern projection unit 202 illustrated in FIG. 2 can project an image pattern onto the lower surface 216 of the first object and/or onto the upper surface 214 of the second object. The projected image pattern can include a pre-determined array of dots or a grid of lines (or a combination thereof) that can cover a portion of each of the surfaces 214/216. A pattern capture unit 204 can capture one or more images reflected from the lower surface 216 of the first object and from the upper surface 214 of the second object. In one embodiment the pattern capture unit can be a CCD or CMOS based camera device, having optics configured to view the projected image pattern. In another embodiment a number of pattern capture units 204 can be disposed at a number of different positions to in some cases simultaneously provide multi-angle captures of the surfaces, thereby in some cases enabling a more accurate surface model to be created. The processing/control unit 212 can process the captured reflected image patterns to estimate a three dimensional surface for each surface 214/216. The processing/control unit 212 can determine how to position the two surfaces 214/216 with respect to each other to align the first object to the second object and to achieve a "best fit" orientation of the two objects with respect to each other.

The processing/control unit 212 can compare one or more dots in the pre-determined array of dots and/or one or more intersections of lines in a grid of lines in the three-dimensional surfaces reconstructed from the captured, reflected image patterns for the two surfaces 214/216. The processing/control unit 212 can determine an orientation of the two surfaces 214/216 with respect to each other that aligns at least three points in the three-dimensional surfaces to each other to achieve co-planarity between the two surfaces 214/216. Select points and/or intersections can be designated as reference points with which to align the two surfaces 214/216. The projected image pattern can vary the size, color, shape or other image characteristic of one or more elements in the dot array and/or line grid that can be captured in the captured, reflected image patterns, thus providing distinct reference points within the array/grid image pattern. In one embodiment, the image pattern can be projected using a laser system. In another embodiment, the laser can be tuned to one or more different wavelengths to provide varying levels of visibility of the reflected image patterns projected onto different types of surfaces.

The processing/control unit 212 can also determine how to change the orientation of the first object with respect to the second object in order to achieve the determined "best fit" orientation. The platform 206 can be integrated as part of a motorized, movable fixture 208 that can translate the platform in an x-y plane. Actuators 210 situated on or in the platform 206 can also be independently manipulated to change their "z height" in order to tilt the first object about the bearing 218 (and thereby change the angular orientation of the lower surface 216 with respect to the upper surface 214). In an embodiment, the first object can rest on the actuators 210 and on the bearing 218 on the platform 206, while the second object can be situated in a fixed position above the first object. The fixture 208 can move in an x-y plane under the control of the processing/control unit 212, thereby translating the position of the lower surface 216 of the first object relative to the upper surface 214 of the second object, which can remain fixed. One or more of the actuators 210 can also be controlled by the processing/control unit 212 to change their height, thereby tilting the lower surface 216 of the first object with respect to the fixed upper surface 214 of the second object.

In another embodiment, the second object can be attached to a motorized, adjustable arm that can manipulate the position of the second object in three-dimensional space (e.g. a six-axis articulated robot). The processing/control unit 212 can command the fixture 208 including the platform 206 and the actuators 210 as well as the adjustable arm (not shown) to alter both the position of the first object and the position of the second object, thereby aligning the lower surface 216 of the first object relative to the upper surface 214 of the second object. In yet another embodiment, the platform can be fixed or provide limited motion (e.g. x-y only or angular tilt only) to manipulate the first object while the second object is attached to another device to provide additional motion changes required to achieve the determined "best fit" orientation of the first surface of the first object with respect to the second surface of the second object. In a further embodiment, the fixture 208 that orients the first object with respect to the second object can be replaced by a six axis parallel kinematic positioning system known as a hexapod. The hexapod can include six controllable actuators that can be driven by the processing/control unit 212 to orient a top plate with six degrees of freedom of motion, namely x, y, z, pitch, roll and yaw. The first object can rest on or be attached to the top plate of the hexapod and the processing/control unit 212 can calculate how to position the top plate (and thereby move the first object) in order to orient the first object with respect to the second object.

The processing/control unit 212 can determine an adjustment of the surfaces 214/216 of the two objects with respect to each other and control the fixture 208 to align the two objects. In an embodiment, the processing/control unit 212 can project and capture the image pattern on the two surfaces during the mechanical alignment and use a feedback system to measure alignment and determine a "best fit" orientation in "real time." In another embodiment, the processing/control unit 212 can determine a first "coarse" alignment based on one or more captured, reflected image patterns, can orient the two surfaces 214/216 of the two objects with respect to each other, and subsequently can determine a second "fine" alignment to re-orient the surfaces 214/216 with respect to each other using a second set of captured, reflected images. The projected image patterns for the "rough" alignment and for the "fine" alignment can be the same image patterns or can be different image patterns. It should be noted that while the projection and collection components are oriented in peripheral locations with respect to the surface alignment, in some embodiments the projection and capture components can be arranged above and/or below upper surface 214 and lower surface 216. In one embodiment the image capture and projection components can be mechanically coupled to a portion of fixture 800.

Figure 3:
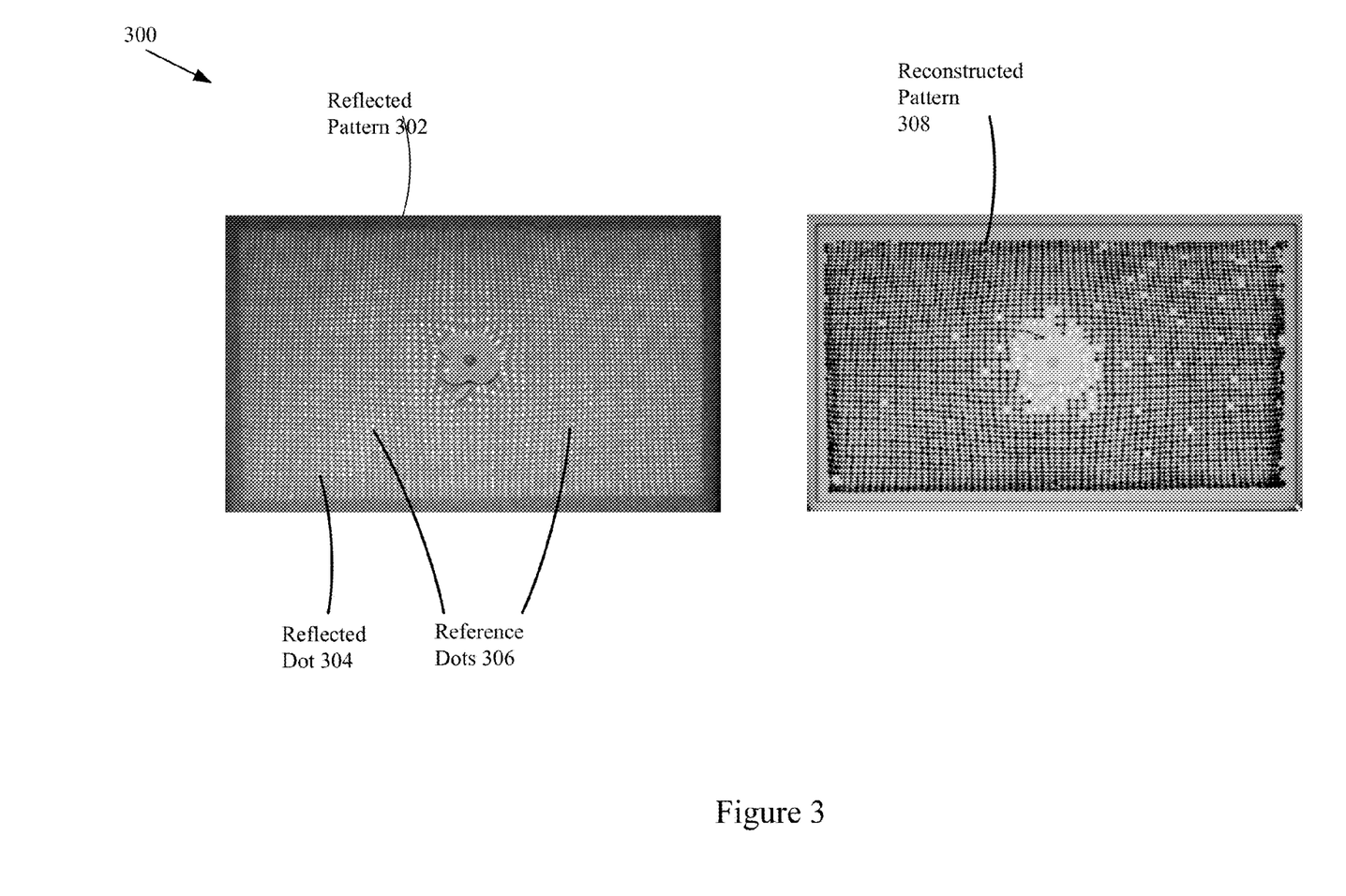
FIG. 3 illustrates a reflected image pattern and a reconstructed image pattern for a surface of an object in a manufacturing process.

FIG. 3 illustrates a representative image pattern projected by an image pattern projection unit 202 onto a manufactured part 300. The projected image pattern can include a number of distinct points to provide a required resolution for measuring the three-dimensional geometric shape of a surface of manufactured part 300. The image pattern capture unit 204 (e.g. a digital camera) can be mounted to capture a reflected image pattern 302 from the reflective surface of the manufactured part 300. The image pattern capture unit 204, the image pattern projection unit 204 and the manufactured part 300 can be oriented spatially with respect to each other by a positioning assembly (not shown). In a representative embodiment, the image pattern capture unit 204 can be adjusted to face a reflective surface of one or more manufactured parts to capture reflected images from the manufactured parts. Depending on the size and shape of the reflective manufactured part, the lens associated with the image pattern capture unit 204 can be chosen to capture a preferred portion of the reflected image. Rather than only adjusting the lens of the image pattern capture unit 204 to change the field of view, the positioning assembly can also be adjusted to allow for different distances between the reflective manufactured part and the image pattern capture unit 204.

The image pattern projected onto the reflective manufactured part 300 can include multiple light and dark regions so that reflected light regions can be captured by the image pattern capture unit 204. In a preferred embodiment, an array of light dots arranged in a regular grid on a dark background can form the projected image pattern. Other pattern images can also be used. The reflected image pattern 302 can include multiple reflected dots 304, and one or more of the reflected dots 304 can be separately identified as reference dots 306. The reference dots 306 can be differentiated by a shape, size, color or other distinguishable characteristic in the reflected image pattern 302. In some embodiments identified reference dots can be used to quickly determine a coarse best fit determination. The processing/control unit 212 can form a reconstructed pattern image 308 based on an analysis of an image capture of the reflected image pattern 302.

Figure 4:
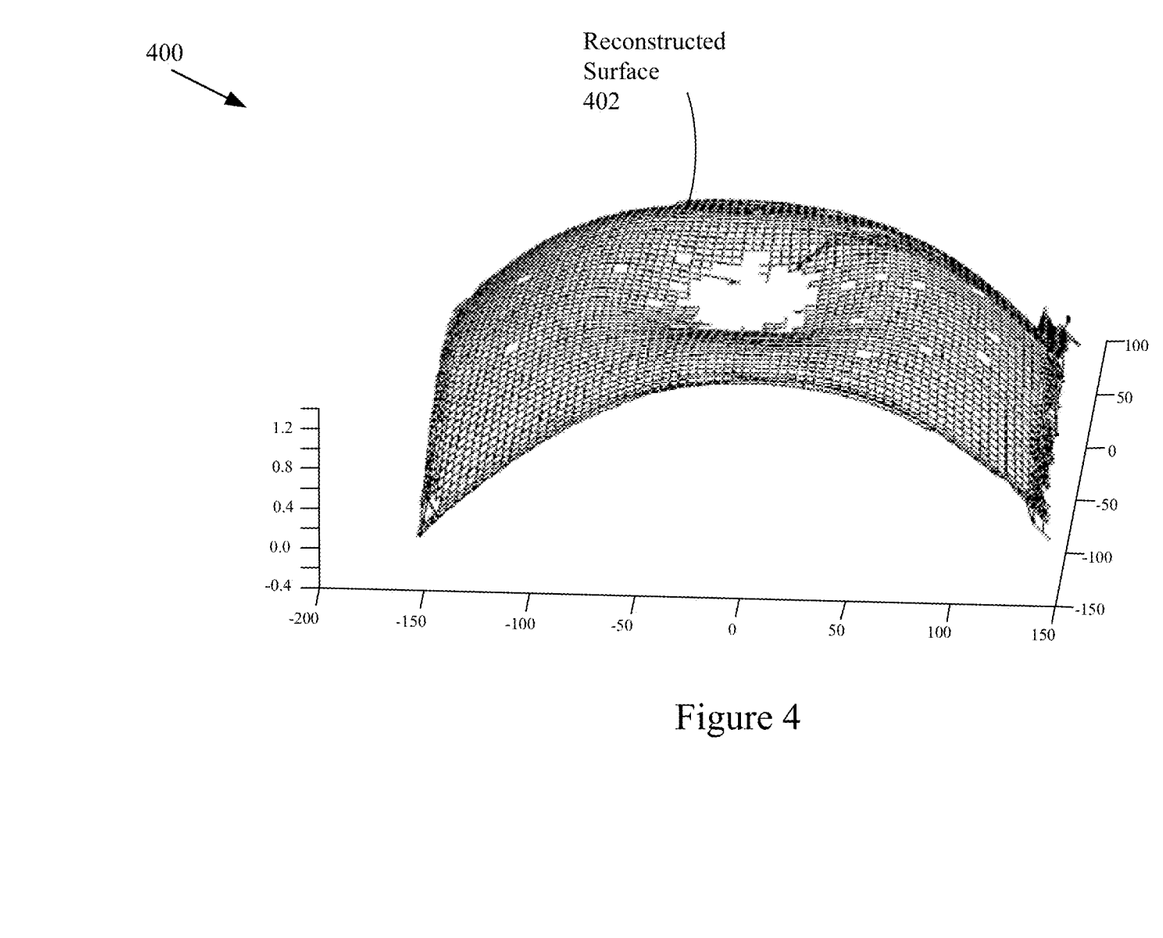
FIG. 4 illustrates a reconstructed three-dimensional surface for the surface of the object illustrated in FIG. 3.

The processing/control unit 212 can also form a reconstructed three-dimensional surface 402 based on the reconstructed pattern image 308 as illustrated by the graph 400 in FIG. 4. Accuracy of the reconstructed surface 402 shape can depend on the spacing between dots in the projected image pattern. More closely spaced dots can provide more information about the surface shape; however, the curvature of the surface across some areas of the reflective object can cause adjacent projected dots in the projected image to be very close together in the reflected image. Accuracy in certain regions of the surface can be improved by changing the density of the dot grid (or the size of each dot) to ensure distinguishable (but still closely spaced) dots. In addition one can also change the position of the image capture device or the orientation of the reflective object to provide a different angle of view. One can also change the magnification of the field of view by altering the focal length of a lens in the image pattern capture unit 204 to capture a specific region of the reflective object. A composite estimate of the reflective surface can be assembled from multiple images captured using different projected image patterns, different spatial orientations, different fields of view or any combination thereof. Reconstructed estimates of two surfaces from two objects can be aligned to each other by comparing geometric properties (such as Euclidean distance between select points) using different orientations of the two surfaces with respect to each other. The processing/control unit 212 can calculate a metric for different orientations and determine an orientation that minimizes (or maximizes) the calculated metric. An orientation of the two surfaces of the two objects with respect to each other to a desired level of accuracy can be achieved through analysis alone (followed by a re-orientation of the objects) or iteratively through a repetitive analysis of captured images for different positions of the two objects.

Figure 5:
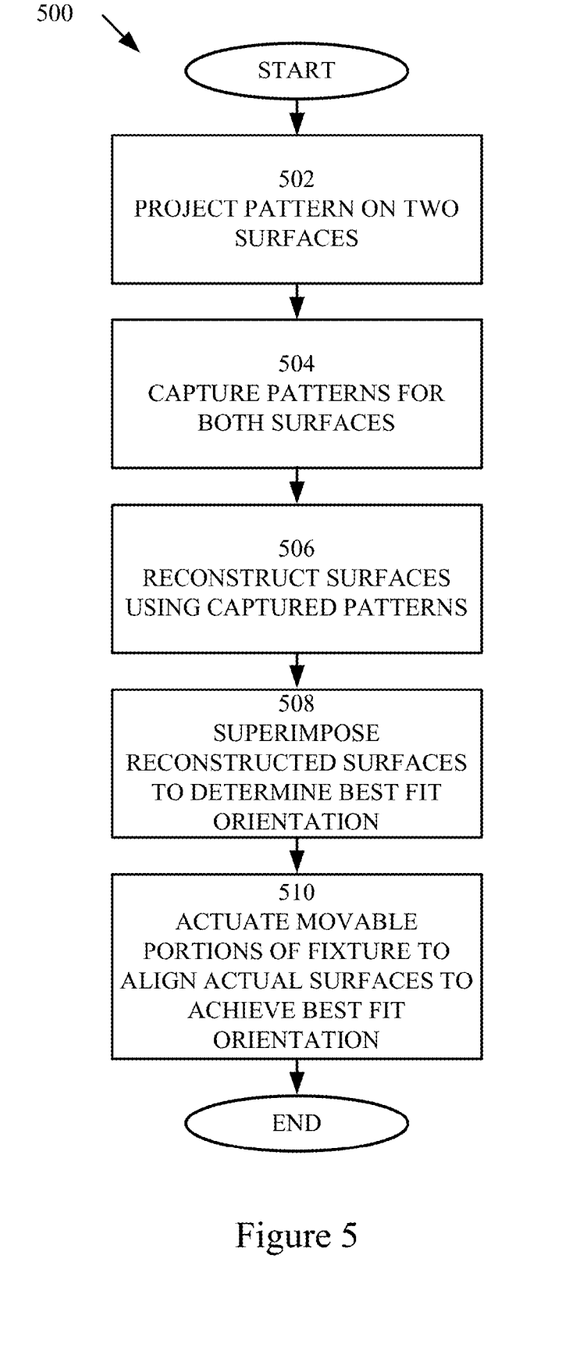
FIG. 5 illustrates a representative method to align two surfaces of two objects in a manufacturing process.

FIG. 5 illustrates a representative method 500 to align two surfaces of two objects with respect to each other using image pattern projection, capture and processing. In a first step 502, an image pattern is projected onto two different surfaces of two objects. The two surfaces, in an embodiment, can mate with each other in order to form a manufactured part, a manufacturing mold or portions thereof. The image pattern can be projected onto the two different surfaces simultaneously or independently by an image projection unit. In an embodiment, the image pattern projected onto a first surface of a first object is the same as the image pattern projected onto a second surface of a second object. In another embodiment, the image patterns projected onto each surface of each object are different. In yet another embodiment, multiple different image patterns are projected onto the surfaces in a sequence. In step 504, at least one reflected image pattern is captured from each of the surfaces of the two objects. In an embodiment, multiple reflected image patterns are captured from each surface.

In step 506, three-dimensional surfaces estimates of the shape of the surfaces of the two objects are reconstructed using the captured, reflected image patterns from the two different surfaces. In step 508, at least two reconstructed surface estimates are superimposed on each other, and a best fit orientation of one surface with respect to the other surface is determined. In an embodiment, the best fit orientation can minimize a difference in geometric positioning of select points in the image patterns. In another embodiment only a limited number of identified critical points or reference dots are analyzed for a faster "rough" best fit orientation determination. In step 510, movable portions of a fixture are actuated to align the actual surfaces of the two objects with respect to each other to achieve the determined best fit orientation. In an embodiment, one object remains fixed, while the other object is translated and angularly rotated to position the two surfaces to achieve the best fit orientation. In another embodiment, both objects are manipulated in three-dimensional space to achieve the determined best fit orientation. In a representative embodiment, image patterns are projected onto the two surfaces of the two objects, reflected image patterns are captured, an alignment metric is calculated, and the surfaces are aligned in real time to minimize the alignment metric. In another representative embodiment, alignment of the two surfaces is achieved using a two stage process, a first stage to align the two surfaces to a "rough" fit and a second stage to align the two surfaces to a "fine" fit. The same or different image patterns can be projected onto the surfaces for each stage.

Figure 6:
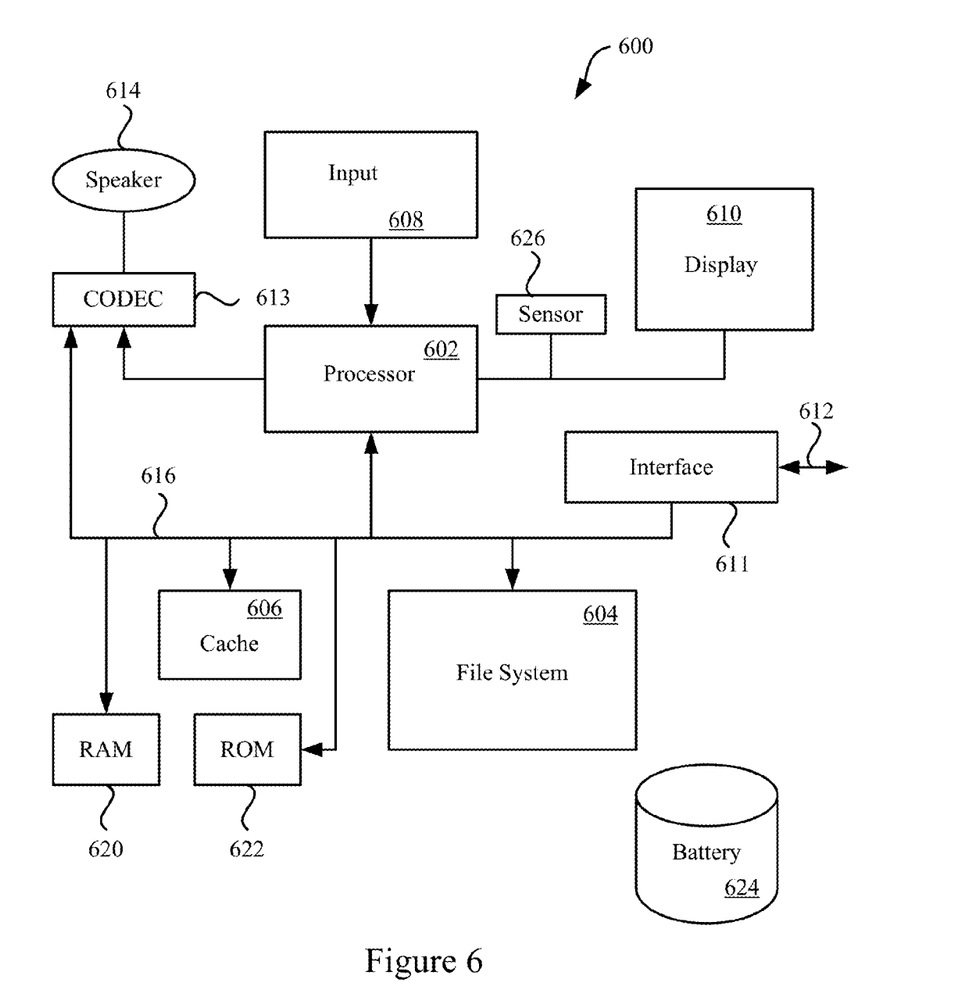
FIG. 6 illustrates a block diagram of an electronic device suitable for controlling some of the processes described in conjunction with example embodiments.

FIG. 6 is a block diagram of an electronic device suitable for controlling some of the processes in the described embodiment. Electronic device 600 can illustrate circuitry of a representative computing device. Electronic device 600 can include a processor 602 that pertains to a microprocessor or controller for controlling the overall operation of electronic device 600. Electronic device 600 can include instruction data pertaining to manufacturing instructions in a file system 604 and a cache 606. File system 604 can be a storage disk or a plurality of disks. In some embodiments, file system 604 can be flash memory, semiconductor (solid state) memory or the like. The file system 604 can typically provide high capacity storage capability for the electronic device 600. In one embodiment the file system can contain image pattern profiles. However, since the access time to the file system 604 can be relatively slow (especially if file system 604 includes a mechanical disk drive), the electronic device 600 can also include cache 606. The cache 606 can include, for example, Random-Access Memory (RAM) provided by semiconductor memory. The relative access time to the cache 606 can substantially shorter than for the file system 604. However, cache 606 may not have the large storage capacity of file system 604. Further, file system 604, when active, can consume more power than cache 606. Power consumption often can be a concern when the electronic device 600 is a portable device that is powered by battery 624. The electronic device 600 can also include a RAM 620 and a Read-Only Memory (ROM) 622. The ROM 622 can store programs, utilities or processes to be executed in a non-volatile manner. The RAM 620 can provide volatile data storage, such as for cache 606

Electronic device 600 can also include user input device 608 that allows a user of the electronic device 600 to interact with the electronic device 600. For example, user input device 608 can take a variety of forms, such as a button, keypad, dial, touch screen, audio input interface, visual/image capture input interface, input in the form of sensor data, etc. Still further, electronic device 600 can include a display 610 (screen display) that can be controlled by processor 602 to display information to the user. Data bus 616 can facilitate data transfer between at least file system 604, cache 606, processor 602, and controller 613. Controller 613 can be used to interface with and control different manufacturing equipment through equipment control bus 614. For example, control bus 614 can be used to control a computer numerical control (CNC) mill, a press, an injection molding machine or other such equipment. For example, processor 602, upon a certain manufacturing event occurring, can supply instructions to control manufacturing equipment through controller 613 and control bus 614. Such instructions can be stored in file system 604, RAM 620, ROM 622 or cache 606.

Electronic device 600 can also include a network/bus interface 611 that couples to data link 612. Data link 612 can allow electronic device 600 to couple to a host computer or to accessory devices. The data link 612 can be provided over a wired connection or a wireless connection. In the case of a wireless connection, network/bus interface 611 can include a wireless transceiver. Sensor 626 can take the form of circuitry for detecting any number of stimuli. For example, sensor 626 can include any number of sensors for monitoring a manufacturing operation such as for example a Hall Effect sensor responsive to external magnetic field, an audio sensor, a light sensor such as a CCD or CMOS camera, computer vision sensor to detect clarity, a distance center to monitor standoff and so on.

Various aspects of the described embodiments can be implemented by software, hardware or a combination of hardware and software. The described embodiments can also be encoded as computer program code on a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for aligning two surfaces of two objects in a manufacturing process, the method comprising:
projecting a first image pattern on a first surface of a first object and a second image pattern on a second surface of a second object;
capturing a first reflected image pattern reflected from the first surface of the first object and a second reflected image pattern from the second surface of the second object by an image capture device;
creating a first reconstructed surface from the first reflected image pattern and a second reconstructed surface from the second reflected image pattern;
comparing the first and second reconstructed surfaces to determine a best fit orientation of the first object to the second object; and
aligning the first and second surfaces to achieve the determined best fit orientation.

2. The method as recited in claim 1, further comprising:
re-aligning the first and second surfaces with respect to each other using a second set of captured, reflected images,
wherein the re-aligning based on the second set of captured, reflected images provides a refined best fit orientation between the two surfaces.

3. The method as recited in claim 1, wherein the aligning comprises actuating a plurality of movable portions associated with a first fixture and a second fixture, the first fixture supporting and maneuvering the first object and the second fixture supporting and maneuvering the second object for achieving a determined best fit orientation between the two surfaces.

4. The method as recited in claim 1, wherein the projected first and second image patterns are a plurality of densely spaced dots provided by a laser.

5. The method as recited in claim 4, wherein the density of the plurality of laser dots is adjusted based on the degree of accuracy desired for the alignment.

6. The method as recited in claim 4, wherein the plurality of the densely spaced laser dots have varying intensity values.

7. The method as recited in claim 1, further comprising:
providing continuous feedback during the aligning of the surfaces by continuously projecting and capturing a third and fourth image pattern on the first and second surfaces respectively.

8. The method as recited in claim 1, further comprising:
joining the first and second surface together; and
coupling the first and second objects together by an ultrasonic welding operation.

9. An apparatus for aligning a first surface of a first object to a second surface of a second object in a manufacturing process, the apparatus comprising:
an image pattern generating unit for projecting an image pattern on a first surface of a first object and on a second surface of a second object;
an image capture unit for capturing a first reflected image pattern reflected from the first surface of the first object and a second reflected image pattern from the second surface of the second object by an image capture unit;
a processing unit configured to create a first reconstructed surface from the first reflected image pattern and a second reconstructed surface from the second reflected image pattern and to evaluate the first and second reconstructed surfaces to determine a best fit orientation of the first object to the second object; and
a fixture configured to align the first surface of the first object relative to the second surface of the second object to achieve the determined best fit orientation.

10. The apparatus as recited in claim 9, wherein the processing unit is electrically coupled to the fixture, the processor configured to provide the fixture precise instructions for how to maneuver the first surface of the first object to best align with the second surface of the second object.

11. The apparatus as recited in claim 9, wherein the image pattern generating unit is configured to transition from the first and second image patterns to a third and fourth image pattern at a predetermined point during an alignment operation.

12. The apparatus as recited in claim 9, wherein the second object is maneuverable by a six-axis articulable arm.

13. The apparatus as recited in claim 12, wherein the first and second objects are maneuvered simultaneously to quickly achieve a determined best fit orientation during an alignment operation.

14. The apparatus as recited in claim 9, wherein the projected first and second image patterns are each a grid of laser dots, the laser dots having varying intensity values.

15. The apparatus as recited in claim 9, wherein the processing unit's best fit determination comprises aligning at least three common points between the first and second surface to achieve co-planarity between the two surfaces.

16. The apparatus as recited in claim 9, further comprising a plurality of image capture units configured to capture different angles of the first reflected image pattern for subsequent processing by the processing unit.

17. A non-transitory computer readable medium for aligning two surfaces in a manufacturing process, comprising:
- computer code for projecting a first grid pattern on a first surface of a first object and a second grid pattern on a second surface of a second object;
- computer code for capturing a first reflected grid pattern reflected from the first surface and a second reflected grid pattern from the second surface by an image capture unit;
- computer code for creating a first reconstructed surface from the first reflected grid pattern and a second reconstructed surface from the second reflected grid pattern;
- computer code for determining a best fit orientation of the first object to the second object based on a plurality of points associated with the first and second reconstructed surfaces; and
- computer code for maneuvering the first surface of the first object relative to the second surface of the second object to achieve the determined best fit orientation.

18. The non-transitory computer readable medium as recited in claim 17, wherein the computer code for superimposing the first and second reconstructed surfaces comprises computer code for superimposing the first and second reconstructed surfaces to determine a best fit orientation of the first object to the second object by aligning at least three common points between the first and second surfaces such that the best fit orientation achieves co-planarity between the two surfaces.

19. The non-transitory computer readable medium as recited in claim 18, wherein the first and second grid patterns are a plurality of perpendicular lines forming a grid of lines across the first and second surfaces of the first and second objects.

20. The non-transitory computer readable medium as recited in claim 19, further comprising:
- computer code for sequentially projecting a plurality of different grid patterns on the first and second surfaces of the first and second objects as the first and second surfaces are aligned.

* * * * *

UNITED STATES PATENT AND TRADEMARK OFFICE
CERTIFICATE OF CORRECTION

PATENT NO.        : 8,780,359 B2
APPLICATION NO.   : 13/629535
DATED             : July 15, 2014
INVENTOR(S)       : Alfredo Castillo et al.

Page 1 of 1

It is certified that error appears in the above-identified patent and that said Letters Patent is hereby corrected as shown below:

In the Claims:

Column 10, line 65 "best fit determination" should read --best fit orientation determination--.

Column 10, lines 66-67 "second surface" should read --second surfaces--.

Signed and Sealed this
Fourteenth Day of April, 2015

Michelle K. Lee
*Director of the United States Patent and Trademark Office*